United States Patent [19]

Ray

[11] Patent Number: 4,827,889
[45] Date of Patent: May 9, 1989

[54] FUEL HEATER THERMOSTAT
[75] Inventor: Dennis A. Ray, Crookston, Minn.
[73] Assignee: Diesel Research and Development Co., Crookston, Minn.
[21] Appl. No.: 197,838
[22] Filed: May 24, 1988
[51] Int. Cl.[4] ............................................. F02M 31/00
[52] U.S. Cl. .................................................. 123/557
[58] Field of Search ........................ 123/557, 543, 545
[56] References Cited

U.S. PATENT DOCUMENTS

| | | | |
|---|---|---|---|
| 3,378,063 | 4/1968 | Mefferd | 123/557 |
| 3,913,543 | 10/1975 | Richard | 123/557 |
| 4,367,717 | 1/1983 | Ray | 123/557 |
| 4,700,047 | 10/1987 | Crossett et al. | 219/205 |
| 4,722,314 | 2/1988 | Martinson | 123/557 |

Primary Examiner—Willis R. Wolfe
Assistant Examiner—M. Macy
Attorney, Agent, or Firm—Palmatier & Sjoquist

[57] ABSTRACT

A manually adjustable thermostat for use in fuel heaters wherein the fuel is heated by engine coolant, with the thermostat including a moveable piston therein to restrict the flow of coolant through the fuel heater in response to changes in the temperature of the heated fuel and having an adjusting screw for manually adjusting the position of the piston to manually adjust the flow of coolant through the fuel heater.

9 Claims, 3 Drawing Sheets

FUEL HEATER THERMOSTAT

BACKGROUND OF THE INVENTION

This invention is generally related to my co-pending applications, U.S. Ser. No. 121,672 filed on Nov. 27, 1987 for "IMPROVED FUEL HEATER", still pending, and my "DIESEL FUEL HEATER" Ser. No. 188,304 patent application filed on Apr. 29, 1988, still pending, both of which are incorporated herein by reference.

This invention generally relates to devices that preheat fuel for use in engines, and more particularly, to thermostats for use in these types of fuel heaters.

It is well known that heating fuel prior to its introduction into the combustion chamber of an engine increases the efficiency of the engine. There are many obstacles to overcome when designing a fuel heating device. The primary object of these fuel heaters is to provide the combustion chamber with fuel that is warmed to a predetermined temperature. The heat output of the fuel heater must be adjustable to satisfy the different amounts of fuel needed, depending on whether the truck is idling or accelerating. The fuel heater must also work within a wide range of environmental temperatures and pressures. The heat output required from the fuel heater at warm temperatures is much less than the heat output required when the outside temperature is below zero.

An important characteristic of the fuel heaters of this type is that the fuel heater must be inexpensive to manufacture and relatively easy to install. Savings from this type of device occur over an extended period of time and results from decreased fuel consumption. Additionally, fuel heaters of this type decrease the amount of harmful emissions created by a combustion engine.

The prior art contains a variety of fuel heaters. U.S. Pat. No. 4,146,002 issued to Quinn on Mar. 27, 1979 heats gasoline by passing the gasoline through helically shaped tubing that is surrounded by engine coolant. Similarly, U.S. Pat. No. 4,700,047 issued to Crossett on Oct. 13, 1987 heats diesel fuel by passing the diesel fuel through an elongate heat exchange coil which is enclosed inside a coolant containing housing.

My prior inventions, U.S. Pat. No. 4,367,717 issued on Jan. 11, 1983; my co-pending application Ser. No. 121,672 filed on Nov. 17, 1987 still pending; my patent application Ser. No. 188,304 entitled "DIESEL FUEL HEATER" filed on Apr. 29, 1988 still pending and my co-pending patent application entitled "SPIRAL DISTRIBUTOR FUEL HEATER" Ser. No. 186,939, still pending all include a thermostat to monitor and regulate the heating of the fuel prior to its introduction into the engine's combustion chamber.

The presently available thermostats for these fuel heaters operate by monitoring the temperature of either the fuel or coolant and once the fuel or coolant reaches a predetermined temperature, the flow of the coolant through the heat exchange chamber is blocked until such time as the temperature of the fuel decreases to its predetermined, preferred temperature. At present, the efficiency of these thermostats is decreased whenever the flow rate or pressure of the coolant or fuel fluctuates. These fluctuations may be caused by a defective water pump; fuel pump or even by the sudden acceleration of the engine. Quite often, when the flow rate or pressure of the coolant fluctuates, the thermostat will stick in the open or closed position and the fuel heater will not operate properly. The present invention addresses the problem by being much more sensitive to the overall fluctuations in flow rate and pressure of the coolant or fuel while being less sensitive to the sudden fluctuations in flow rate or pressure.

Additionally, the flow of fuel and coolant in the present invention is arranged so as to flow perpendicularly to the various elements of the thermostat. This overcomes the problem which occurred in some of the prior thermostats wherein a sudden increase in the demand for coolant would draw the needle valve towards the needle valve housing and restrict the flow of coolant in the fuel heater. Another approach has been to direct the coolant inwardly perpendicular to the needle valve. Over a period of time this will cause the needle valve to improperly seat in the needle valve housing and greatly reduce the efficiency of the needle valve.

SUMMARY OF THE INVENTION

An object of this invention is to produce a reliable thermostat for use in fuel heaters.

Another object of this invention is to produce a thermostat which operates efficiently in pressure ranges of 5 psi to 100 or more psi.

Another object of this invention is to provide a thermostat for fuel heaters which will enable the fuel heater to evenly heat the fuel while being responsive to gradual fluctuations in the flow rate and pressure of the coolant and fuel in the fuel heater.

Another object of this invention is to create an overall fuel heater that will enable the engine to burn fuel more efficiently and thereby reduce the amount of unburned fuel that is released into the atmosphere.

Another object of this invention is to provide a thermostat which may be manually adjusted and will further respond automatically to the changes in the temperature of the fuel.

A feature of this invention is to provide a thermostat which will automatically adjust the flow of coolant through the fuel heater according to the predetermined or preferred range of fuel temperatures in the fuel heater. Additionally, the thermostat may be manually adjusted to either restrict or completely block the flow of coolant through the fuel heater.

The thermostat consists of an adjusting screw; a heat insulator; a power pill housing; a power pill; an insulating extension; a piston and an adjustable cylinder. The adjusting screw extends from the outer surface of the top cover of the fuel heater and into the top cover to a point adjacent to the fuel outlet. The inner end of the adjusting screw contacts the heat transfer end of the power pill housing. The heat transfer end of the power pill housing extends across the fuel outlet and is in flow communication with the heated fuel. The second end of the power pill housing is enclosed by the heat insulator and is retained in the heat insulator by a pair of O-ring and grooves which frictionally contact the inner surface of the heat insulator. The heat insulator is retained in the top cover at a point adjacent to the fuel outlet by a pair of O-rings and grooves which frictionally fit between the top cover and the heat insulator.

The interior of the power pill housing encloses the power pill and the extension end of the insulating extension. The power pill expands or contracts according to the temperature of the heated fuel as the fuel passes around the outer surface of the power pill housing. The extension end of the insulating extension is enclosed by the power pill housing and is in a contacting relation with the power pill. As the power pill expands, the insulating extension is moved beyond the power pill housing to contact the piston. The piston balances the pressure created by the expansion of the power pill with the opposite pressure created by a spring located within the adjustable cylinder. As the power pills expands, the insulating extension pushes against the piston which in turn compresses the spring and restricts the flow of coolant through the adjustable cylinder. Additionally, the piston utilizes a bleed port to allow coolant to equalize the pressure between the insulating extension and the spring in the adjustable cylinder.

In operation, the preferred operating ranges for this thermostat are determined primarily by the temperature range of the power pill chosen. Additionally, once the fuel heater is installed, the thermostat may be fine tuned by adjusting the adjusting screw to obtain the optimum flow of coolant through the adjustable cylinder and fuel heater. Finally, if the fuel heater is not operating properly, the fuel heater may be turned off by merely rotating the adjustable cylinder to its off position.

An advantage of the present invention is that the temperature of the heated fuel is carefully monitored so as to provide evenly heated fuel for the engine combustion chamber.

Another advantage of the present invention is that the thermostat is adjustable to account for the blend of the fuel, the outside temperature and the coolant and fuel flow rates to provide the optimum fuel temperature for engine combustion.

Another advantage of this invention is that it is safe to use and will automatically shut restrict the flow of coolant if the fuel reaches a predetermined temperature.

Another advantage of this invention is that the thermostat may be manually rotated to shut down the fuel heater if the fuel heater is not operating properly.

DETAILED DESCRIPTION OF THE PREFERRED EMBODIMENT

Figure 1:
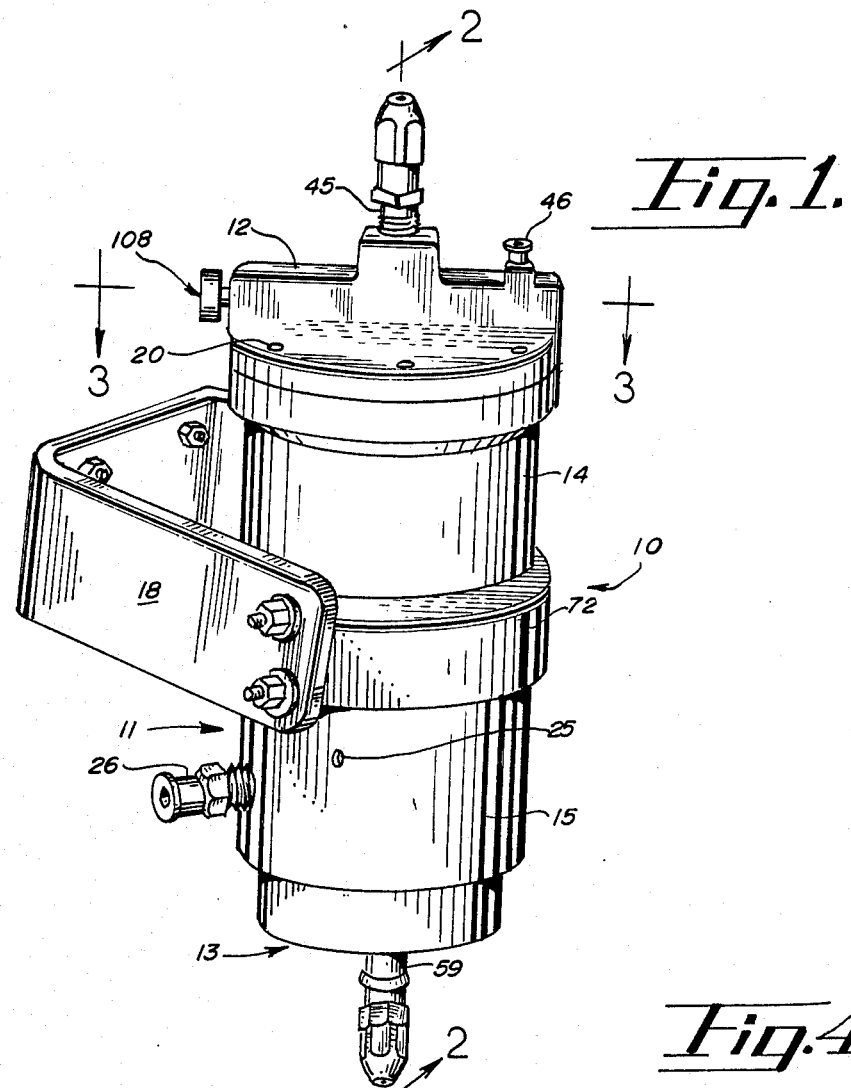
FIG. 1 is a perspective view of a diesel fuel heater utilizing the present invention.
Figure 4:
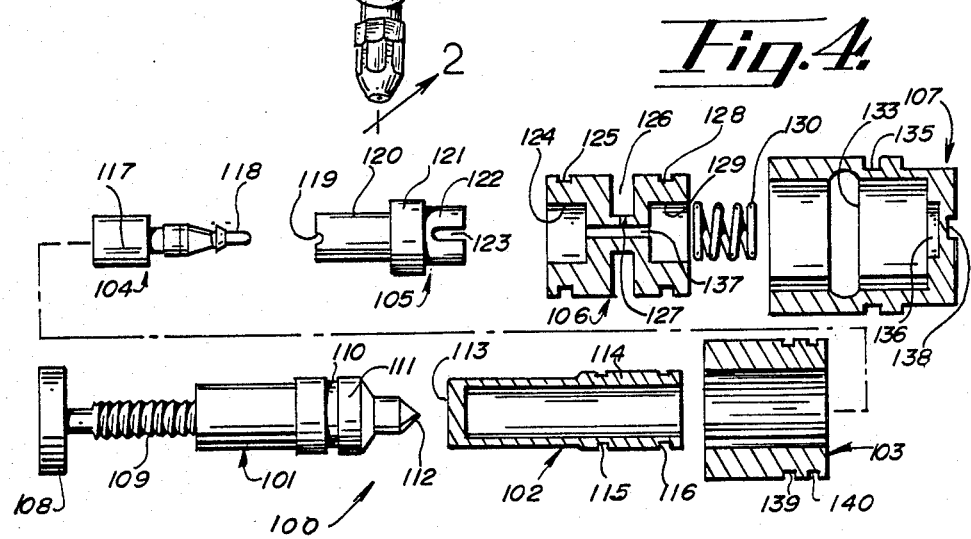
FIG. 4 is an exploded cross-sectional view of the present invention.
Figure 2:
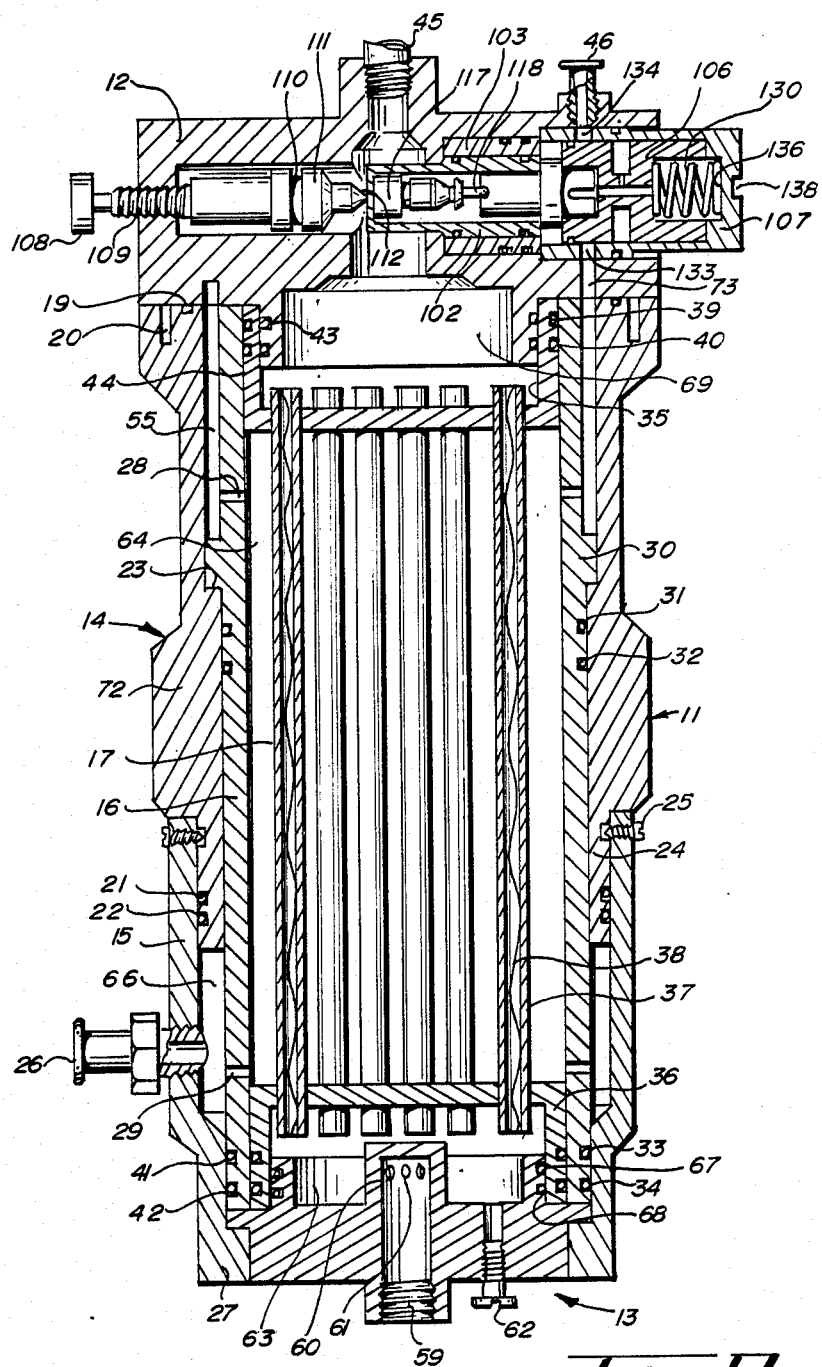
FIG. 2 is a detailed cross-sectional view of the fuel heater taken along lines 2—2 of FIG. 1.
Figure 3:
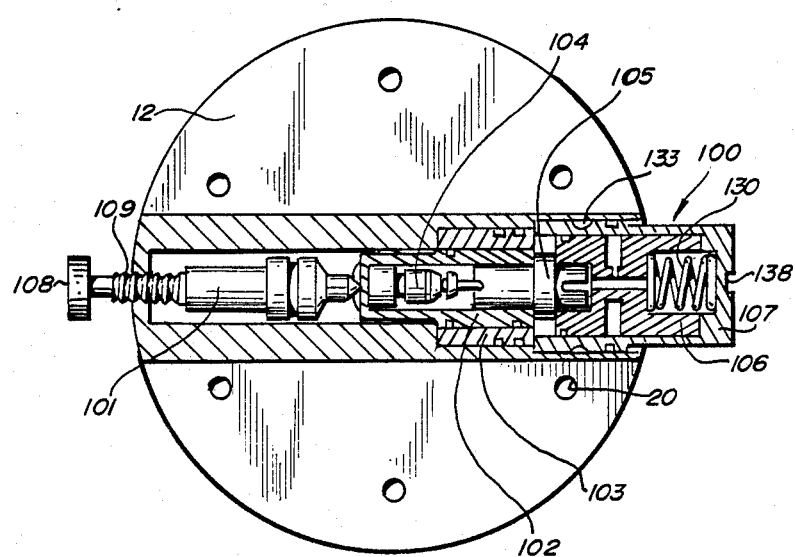
FIG. 3 is a detailed cross-sectional view of the fuel heater taken along lines 3—3 of FIG. 1.

It is anticipated that the present invention may be adapted for use in a variety of fuel heaters. In order to more fully describe the present invention, reference is made to the elements and operation of my co-pending patent application Ser. No. 188,304 entitled "DIESEL FUEL HEATER" filed on Apr. 29, 1988, still pending, which is fully incorporated herein by reference.

The fuel heater is described herein and is referred to generally as 10. The fuel heater 10 has as its principal parts, a central annular section 11, a top cover 12 and a bottom cover 13. The central annular section 11 is comprised of two concentric walls which, in combination with the top and bottom covers 12 and 13, create a heat transfer chamber 64. The first concentric wall is comprised of an upper coolant ring 14 and a lower coolant ring 15 which, in combination, extend from the top cover 12 to the bottom cover 13. The next concentric wall is the coolant distributor 16 which, in combination with the upper and lower coolant rings 14 and 15, form upper and lower coolant distribution passageways 55 and 66. Located inwardly from the coolant distributor 16 and extending through the heat transfer chamber 64 is the heat exchanger 17.

The upper coolant ring 14 is an elongate annular aluminum cylinder which extends from the bottom of the top cover 12 to an overlapping relationship with the lower coolant ring 15. The outer surface of the upper coolant ring 14 includes a circumferential ridge 72 for the attachment of an adjustable mounting bracket 18 thereon. The top surface of the upper coolant ring 14 includes a top annular O-ring and groove 19 to provide a leak proof seal with the top cover 12. Additionally, the top surface of the upper coolant ring 14 includes threaded openings thereon for the insertion of set screws 20 to fasten the top cover 12 onto the upper coolant ring 14. The inner surface of the upper coolant ring 14 includes a central annular ridge 23 for engagement with the outer surface of the coolant distributor 16. Positioned along the lower outer surface of the upper coolant ring 14 is a pair of O-rings and grooves 21 and 22 which, in combination with the lower inner surface of the lower coolant ring 15, form a leak-proof seal. Positioned immediately above the O-ring and grooves 21 and 22, is a lower annular ridge 24 which, in combination with set screws 25, enables the lower coolant ring 15 to be rotatably attached to the upper coolant ring 14.

The lower coolant ring 15 is another elongate aluminum cylinder which extends from an overlapping relationship with the upper coolant ring 14 to the bottom cover 13. The lower coolant ring 15 includes a coolant inlet 26 and may be rotated to position the coolant inlet 26 for the convenient attachment of the fuel heater 10 to the diesel engine's pre-existing coolant system. The inner surface of the bottom of the lower coolant ring 15 includes an annular bottom cover ridge 27 which circumferentially engages the bottom cover 13.

The next concentric wall in the central annular section 11 is the coolant distributor 16. This wall is constructed of aluminum and contains evenly spaced upper and lower coolant passageways 28 and 29 which open into the heat transfer chamber 64. The outer surface of the coolant distributor 16 includes an annular distributor ridge 30 which rests on the central annular ridge 23 of the upper coolant ring 14. The coolant distributor 16 is further held in position by a pair of centrally located O-rings and grooves 31 and 32 which engage the inner surface of the upper coolant ring 14 to form a leak proof seal between the coolant distributor 16 and the upper coolant ring 14. The lower outer surface of the coolant distributor 16 includes a pair of bottom O-rings and grooves 33 and 34 which engage the inner surface of the lower coolant ring 15 to create a leak proof seal between the coolant distributor 16 and the lower coolant ring 15.

Located inwardly from the coolant distributor 16 is the heat exchanger 17. The heat exchanger 17 is preferably constructed of brass or other nonreactive material and consists of a top fuel basin 35, a bottom fuel basin 36 and centrally located fuel tubes 37. In the present invention, at least 16 fuel tubes 37 are arranged in a pair of evenly spaced circular rows. The top and bottom fuel basins 35 and 36, respectively, in combination with the coolant distributor 16, form the heat transfer chamber 64. The fuel tubes 37 extend upwardly from the bottom fuel basin 36; through the heat transfer chamber 64 and into the top fuel basin 35. The top fuel basin 35 is held in position by a pair of top O-rings and grooves 39 and 40 which engage the inner surface of the coolant distributor 16 to form a leak proof seal between the heat exchanger 17 and the coolant distributor 16. The bottom fuel basin 36 includes a pair of bottom O-rings and grooves 41 and 42 which engage the inner surface of the coolant distributor 16 to form a leak proof seal between the bottom of the heat exchanger 17 and the coolant distributor 16.

The bottom cover 13 is constructed of aluminum and includes the fuel inlet 59. A fuel distributor 60 is in flow communication with the fuel inlet 59 and consists of a top, flat surface and horizontally oriented fuel passageways 61. Located on the inner, bottom surface of the bottom cover 13 is a condensation plug 62 to remove condensation from the lower fuel collection area 63. The bottom cover 13 is held in position by a pair of O-rings and grooves 67 and 68 which engage the inner surface of the bottom fuel basin 36 to form a leak proof seal between the bottom cover 13 and the bottom fuel basin 36.

The top cover 12 is preferably constructed of aluminum and includes a fuel outlet 45, a coolant outlet 46 and an adjustable thermostat 100. The adjustable thermostat 100 monitors the temperature of the fuel and limits the flow of coolant through the coolant outlet 46. The adjustable thermostat 100 includes a threaded adjusting screw 101 which extends inwardly into the top cover 12 to a location adjacent to the fuel outlet 45. The adjusting screw 101 is preferably constructed of aluminum or brass and consists of an adjusting knob 108; a threaded section 109; an O-ring and groove 110; a retaining collar 111 and a contact point 112. The O-ring and groove 110 and retaining collar 111 act in combination to prevent the heated fuel from passing out of the fuel heater 10 through the threaded opening for the adjusting screw 101. The contact point 112 is positioned adjacent to the heat transfer end 113 of the power pill housing 102. The power pill housing 102 is preferably constructed of a durable material such as a phenolic resin. The heat transfer end 113 of the power pill housing 102 extends across the fuel outlet 45 to allow the temperature of the heated fuel to be monitored by the adjustable thermostat 100. The second end of the power pill housing 102 is the retaining end 114 and is positioned adjacent to the fuel outlet 45. The retaining end 114 is held in position by a pair of O-rings and grooves, 115 and 116, which frictionally engage the interior of the heat insulator 103. The heat insulator 103 is preferably constructed of a phenolic resin and surrounds the retaining end 114 of the power pill housing 102 and is positioned adjacent to the fuel outlet 45. The heat insulator 103 is held in position by a pair of O-rings and grooves, 139 and 140, and prevents the transfer of heat from the heated fuel directly to the coolant by heating the top cover 12.

A power pill 104 is located inside of the power pill housing 102. The power pill 104 is a commercially available temperature sensing device sold by Robertshaw Controls Company of Knoxville, Tenn. The power pill 104 is designed for use in a variety of temperature ranges and consists of a power pill body 117 and a needle 118. The power pill body 117 expands or contracts according to the temperature of the heated fuel which causes the needle 118 to move in response to the temperature of the fuel. The needle 118 of the power pill 104 is in contacting engagement with the needle seat 119 on the insulating extension 105. The insulating extension 105 is preferably constructed of a phenolic resin and functions essentially as a means of transferring the movement of the power pill 104 to the piston 106. The extension end 120 of the insulating extension 105 is positioned within the retaining end 114 of the power pill housing 102. The collar 121 of the insulating extension 105 acts as a spacing means between the power pill housing 102 and the remaining elements of the adjustable thermostat 100. The second end of the insulating extension 105 is the piston contact end 122. The piston contact end 122 of the insulating extension 105 includes an equilibrium groove 123 which extends across the diameter of the piston contact end 122 and allows coolant to flow in the interior surface of the first end 124 of the piston 106.

The piston 106 is preferably constructed of stainless steel and consists of a first end 124; a second end 129; a pair of steel scraper O-rings and grooves, 125 and 128; a bleed port 127 a coolant channel 126 and a pressure channel 137. The first and second ends, 124 and 129 respectively, of the piston 106 are held in position by a pair of O-rings and grooves, 125 and 128 which facilitate the movement of the piston 106 by scraping the interior of the adjustable cylinder 107 to prevent the collection of grit or debris therein. The first end 124 of the piston 106 restricts the flow of coolant into the top cover 12 by partially blocking the flow of coolant from the annular coolant flow ring 73. A constant amount of coolant is allowed to flow into the top cover 12 by the bleed port 127 which allows coolant to flow from the coolant flow channel 126 into the pressure channel 127. This constant flow of coolant through the bleed port 127 equalizes the coolant pressure on the first and second ends, 124 and 129 respectively, of the piston 106 and lubricates the circumference of the piston 106. The piston 106 is enclosed within the adjustable cylinder 107. The adjustable cylinder 107 is preferably constructed of stainless steel and is frictionally held in position by an O-ring and groove, 135. The adjustable cylinder 107 includes a bottom coolant opening 133; a top coolant opening 124; a spring retaining groove 136 and a manual adjustment groove 138. A spring 130 is positioned in the spring retaining groove 136 to engage the interior surface of the second end 129 of the piston 106.

In operation, the fuel flows into the fuel heater 10 through fuel inlet 59. The fuel then flows into the fuel distributor 60 and through the fuel passageways 61. The fuel passageways 61 force the fuel to flow horizontally into the lower fuel collection area 63. The fuel tubes 37 extend into the lower fuel collection area 63 a slight distance to prevent the fuel from flowing at varying rates into the individual fuel tubes 37. The fuel heater 10 optimally includes at least 16 fuel tubes 37 which act in combination to decrease the flow rate and pressure of the fuel as the fuel passes through the heat transfer chamber 64. Inside each fuel tube 37 is a tube insert 38 which spirals the fuel through the fuel tube 37 and thereby provides a more efficient transfer of heat from the coolant to the fuel. Once the fuel passes through the the fuel tubes 37, it passes into the top fuel basin 35. The top fuel basin 35 and the top cover 12 form the top fuel collection area 69 to collect the heated fuel and return the fuel to its original pressure and flow rate. From the top fuel collection area 69, the fuel flows across the power pill housing 102 and heats the power pill 104 of the adjustable thermostat 100. The fuel then flows out of the fuel heater 10; through the fuel outlet 45 and ultimately into the combustion chamber of the diesel engine.

The coolant enters the fuel heater 10 through the coolant inlet 26 located on the lower coolant ring 15. The coolant then flows through the lower coolant distribution passageway 66 and into the lower coolant passageways 29 located on the coolant distributor 16. Once the coolant flows through the lower coolant passageways 29 it enters the heat transfer chamber 64. In the heat transfer chamber 64, the coolant passes across the outer surface of the fuel tubes 37 to transfer the heat from the coolant to the fuel tubes 37 and heats the fuel. The coolant flows upwardly through the heat transfer chamber 64 so that the hottest coolant contacts the coolest fuel at the lower end of the heat transfer chamber 64; as the coolant and fuel pass into the upper end of the heat transfer chamber 64, the temperature of the coolant will decrease and the temperature of the fuel will have increased. The coolant passes from the heat transfer chamber 64 into the upper coolant distribution passageway 65 through the upper coolant passageways 28 located near the top end of the coolant distributor 16. The coolant flows upwardly from the upper coolant distribution passageway 65 into the annular coolant flow ring 73 located on the bottom surface of the top cover 12. The coolant then flows into the top cover 12 by passing through the bottom coolant opening 133 of the adjustable cylinder 107. After flowing through the coolant channel 126 and contacting the first end 124 of the piston 106, the coolant flows out of the top cover 12 by passing through the top coolant opening 134 of the adjustable cylinder 107 and into the coolant outlet 46.

The adjustable thermostat 100 may be manually adjusted by manually rotating the adjusting knob 108. When the adjusting screw 101 is rotated inwardly, the contact point 112 pushes against the power pill housing 102 to move the power pill 104 and insulating extension 105 toward piston 106. The piston contact end 122 of the insulating extension 105 pushes against the first end 124 of the piston 106 and causes the first end 124 to partially block the bottom coolant opening 133 of the adjustable cylinder 107. Additionally, if the fuel heater 10 is to be shut off, the adjustable cylinder 107 may be rotated by turning the manual adjustment groove 138 to the off position. When the manual adjustment groove 138 is in the off position, the coolant is prevented from entering the top cover 12 because the bottom coolant opening 133 is no longer in alignment with the annular coolant flow ring 73.

In normal operation, the adjusting screw 101 is only used to fine tune the adjustable thermostat 100. Rotation of the adjusting screw 101 adjusts the thermostat to its optimum position according to the unique fuel and coolant flow rates of each engine; however, the adjustable thermostat 100 will automatically respond to fluctuations in the fuel and coolant temperatures during the operation of the fuel heater 10.

As the temperature of the fuel flowing through the fuel outlet 45 increases, the heat is transferred to the power pill housing 102. From the power pill housing 102 the heat is transferred to the power pill 104 which causes the power pill body 117 to expand. The expansion of the power pill body 117 causes the needle 118 of the power pill 104 to press against the needle seat 119 of the insulating extension 105. The insulating extension 105 then presses against the first end 124 of the piston 106. Meanwhile, the piston 106 is pushed in a constant manner in the opposite direction by the spring 130. As the pressure against the first end 124 of piston 106 increases, the first end 124 of the piston 106 begins to partially restrict the flow of coolant through the bottom coolant opening 133 and thereby decreases the coolant flow through the fuel heater 10 and ultimately decreases the heat transferred to the fuel.

As the temperature of the fuel decreases, the first end 124 of the piston 106 is returned to its normal position by pressure from the spring against the second end 129 of the piston 106. The movement of the piston 106 is further regulated by the constant flow of coolant through the bleed port 127 and pressure channel 137. By allowing a constant flow of coolant into the first and second ends, 124 and 129 respectively, of the piston 106, a sudden fluctuation in the flow rate or pressure of the coolant will not force the piston 106 to move rapidly in either direction. The coolant in the first and second ends, 124 and 129 respectively, acts as a hydraulic cushion to slow the movement of the piston 106 until the coolant pressure on each side of the piston 106 is stabilized. Additionally, the use of the steel scraper O-rings, 125 and 128, to remove debris or grit from the interior of the adjustable cylinder 107 decreases the likelihood that the piston 106 will become stuck in the adjustable cylinder 107. Therefore, the adjustable thermostat 100 of the present invention is designed to operate in a safer manner than the presently available fuel heater thermostats.

What is claimed:

1. A thermostat for fuel heaters wherein the fuel is heated by engine coolant and said thermostat comprises
    a temperature sensing means for sensing the temperature of fuel in the fuel heater,
    said temperature sensing means in contacting relation with the first end of a coolant flow restricting piston,
    said piston having a second end in contacting relation with a pressure means wherein said temperature sensing means and said pressure means assert opposing forces against said piston and said piston in response to an increase in force from said temperature sensing means will restrict the flow of coolant through the fuel heater, and
    said piston further having a bleed port therein to allow coolant to flow to said first and second ends of said piston.

2. The thermostat of claim 1, wherein the temperature sensing means is partially enclosed by a housing which is in flow communication with the heated fuel of the fuel heater and the temperature of the fuel is transmitted through the housing to the temperature sensing means.

3. The thermostat of claim 2, wherein said housing is partially enclosed by an insulating ring positioned adjacent to the heated fuel to prevent the transfer of heat from the fuel directly to the piston.

4. The thermostat of claim 1, wherein the position of the temperature sensing means may be manually adjusted by an adjustable screw in contacting relation with said temperature sensing means.

5. The thermostat of claim 1, wherein the piston is partially enclosed in a piston housing and said piston includes a cleaning means to prevent the accumulation of debris between the piston and said piston housing.

6. An adjustable thermostat for use in fuel heaters wherein the fuel is heated by engine coolant and said thermostat comprises a manually adjustable screw having inner and outer ends, said inner end in contacting relation with a temperature sensing housing, said housing being in flow communication with the heated fuel from the fuel heater, said housing further being in heat transferring relation with a temperature sensing means for the transfer of heat from the fuel to the temperature sensing means, said temperature sensing means being responsive to changes in the temperature of the fuel and in contacting relation with a coolant flow restricting piston wherein said temperature sensing means expands in response to increases in the temperature of the fuel and contacts the piston to cause the piston to restrict the flow of coolant through the fuel heater.

7. The thermostat of claim 6 wherein
the piston has first and second ends,
said second piston end is in contacting relation with a pressure means,
said pressure means in combination with an adjustable cylinder operates to oppose the contacting relation of the temperature sensing means against the first end of said piston.

8. The thermostat of claim 7 wherein said adjustable cylinder includes top and bottom coolant openings therein and said adjustable cylinder is rotatable to block the flow of coolant through the fuel heater.

9. The thermostat of claim 6, further comprising
first and second ends on said piston wherein said first end is in contacting relation with the temperature sensing means,
said second end is in contacting relation a pressure means wherein said pressure means is biased against the contact of the temperature sensing means, and
said piston further having a bleed port and coolant channel in continuous flow communication with the first and second ends of said piston to hydraulically control the movement of said piston.

* * * * *